Nov. 7, 1944.  H. L. FITCH ET AL  2,362,434
TRANSPARENCY MOUNT
Filed May 8, 1942
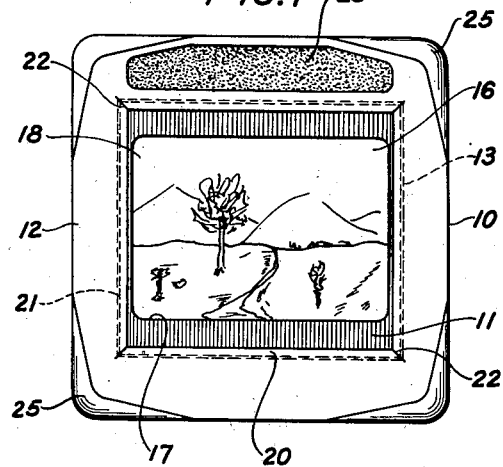
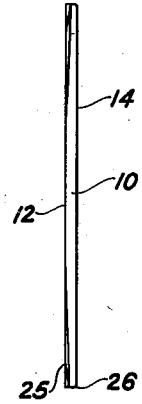
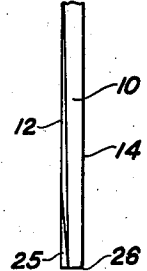
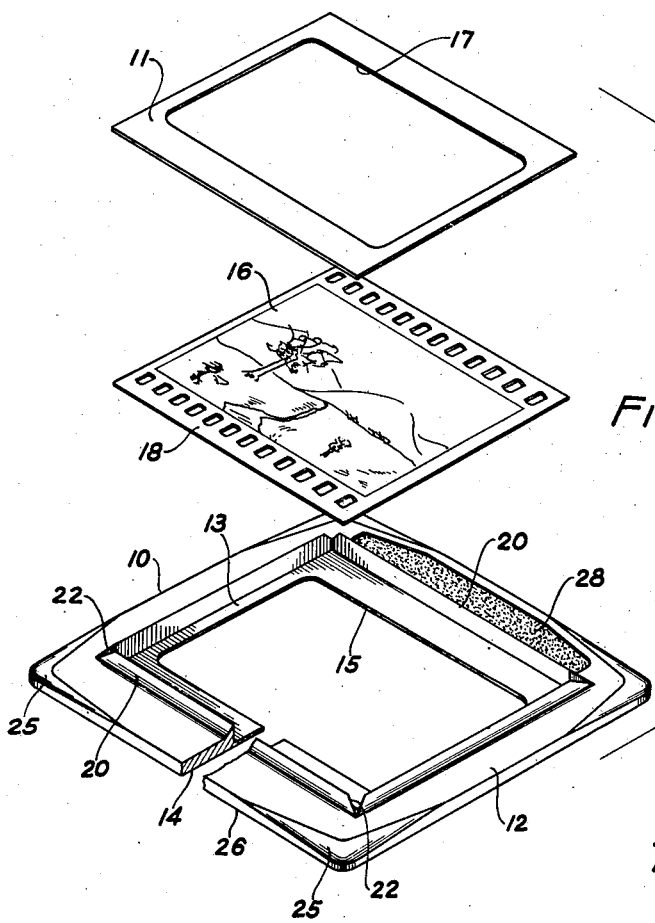
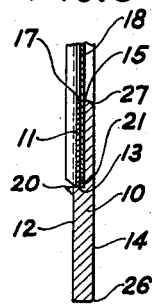
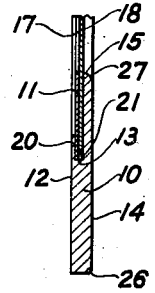
HAROLD L. FITCH
THOMAS L. O'TOOLE
INVENTORS
BY
ATTORNEYS Patented Nov. 7, 1944

2,362,434

UNITED STATES PATENT OFFICE 2,362,434

TRANSPARENCY MOUNT

Harold L. Fitch and Thomas L. O'Toole, Rochester, N. Y., assignors to Eastman Kodak Company, Rochester, N. Y., a corporation of New Jersey Application May 8, 1942, Serial No. 442,172

12 Claims. (Cl. 88—26)

The present invention relates to a mount for holding transparencies for viewing or projection.

Transparencies are usually in the form of thin, flexible photographic films, colored or black and white, and it has been the previous practice to mount such transparencies in mounts made of metal and cardboard to lend the same rigidity, or to hold the same between two pieces of glass bound at the edges by tape or other suitable means. Cardboard mounts have been found unsuitable, particularly when the mounts are used in well-known slide changers, due to the fact that the edges of the cardboard can become bent and frayed with the result that the picture apertures lose their sharp definition and the mounts jam in the slide changer. Mounts using glass plates present the inherent disadvantage that they are subject to breakage. Metal mounts are the most suitable of those previously used from the standpoint of durability but they are expensive, heavy, and possess sharp edges which tend to abraid the transparencies.

Therefore, one object of the present invention is the provision of a transparency mount which is made of a thermoplastic material, or a material sensitive to heat and pressure, whereby the mount possesses all of the features desired in a mount of this kind including rigidity, durability, light weight, pleasing appearance, etc.

Another object is to provide a mount of the type set forth, the main part of which is designed to take advantage of the characteristics of a thermoplastic material to allow it to be readily fabricated in an inexpensive and rapid manner.

And another object is to provide a mount of the type set forth which makes use of a method of mounting a transparency therein which utilizes the ability of thermoplastic materials to be reformed after original molding.

A further object is to provide a mount of the type set forth which makes use of the characteristics of a thermoplastic material to allow a transparency to be easily and accurately assembled in a rapid and easy manner.

And yet another object is to provide a mount which is practically indestructible, has picture defining apertures which are sharp and accurate, and a mount which protects the surfaces of the transparencies from abrasion due to mounts rubbing over one another even though no glasses, or other transparent covering, are used to cover the surfaces of the transparencies.

Still another object is to provide a mount of the type set forth which is formed so as to facilitate its use in any of the well-known slide changers on the market and to eliminate the jamming of such slide changers which is prevalent when well-known types of slides are used.

Generally, a mount constructed in accordance with the present invention comprises a frame molded from a thermoplastic material and including a recess in the front face thereof into which a transparency and mask are adapted to be placed in superposed relation over an aperture in the rear face of the frame which is of a size and shape to frame the picture area of the transparency. The transparency is adapted to be held in assembled relation in said recess, when upstanding ribs molded on the front face of said frame adjacent at least two edges of said recess are flowed inwardly of said recess into overlapping relation with the edges of the mask by the application of heat and pressure.

The novel features that we consider characteristic of our invention are set forth with particularity in the appended claims. The invention itself, however, both as to its organization and its methods of use, together with additional objects and advantages thereof, will best be understood from the following description when read in connection with the accompanying drawing in which, Fig. 1 is a front elevational view of a completely assembled mount constructed in accordance with the present invention, showing a transparency in position within the mount.

Fig. 2 is an end elevational view of the assembled mount shown in Fig. 1,

Fig. 3 is an enlarged and elevational view of one corner of the assembled mount to clearly indicate how the front face of the mount at and adjacent the corners thereof is tapered to reduce the thickness of the mount at these portions, Fig. 4 is an exploded perspective view showing the parts which go to make up a complete mount in accordance with the present invention, and illustrating the manner in which these parts are to be assembled.

Fig. 5 is a sectional view through one side of the frame with the transparency and mask properly seated in the recess, but with the upstanding rib of the front face of the frame adjacent the recess in a normal upstanding position, and, Fig. 6 is a sectional view similar to Fig. 5 but showing how, by the application of heat and/or pressure, the upstanding rib has been flowed inwardly of the recess and into overlapping relation with the edges of the mask to hold the latter and the transparency in assembled relation in the recess of the frame.

Like reference characters refer to corresponding parts throughout the drawing.

Referring now to the drawing, the present transparency mount consists of two pieces; one, a thermoplastic frame 10, and the other, an inlay mask 11.

The plastic frame 10 may be made of any thermoplastic material whose shrinkage characteristic is small enough to allow continued use of the finished mount in any well-known type of still projector and automatic slide changer, and whose temperature characteristics are such as to satisfactorily withstand the heat to which such a mount is liable to be subjected in still projectors of the type mentioned.

The frame 10 is made in the form shown in Fig. 4 by any suitable molding operation, such as compression molding, injection molding, transfer molding, etc. As shown, the front face 12 of the finished molded plastic frame 10 is provided with a recess 13 in which a transparency, which in the present instance is a strip of 35-mm. photographic film, is adapted to be seated. The rear face 14 of the frame has a picture aperture 15 centrally located of the base of the recess 13, said picture aperture being of a size and shape to frame the picture area 16 of the transparency 18 when the latter is seated in the recess 13.

The inlay mask 11 is formed of an opaque material and has outside dimensions which approximate those of the recess 13 so that the mask will fit more or less snugly therein in superposed relation to the transparency. This mask is provided with a picture aperture 17 which is adapted to frame the picture area of the transparency, and which aperture will register with the picture aperture 15 in the frame when the mask is seated in the recess. The mask may be made of any suitable opaque material, but it is desirable that the material have a certain amount of rigidity and be such that a picture aperture having sharp edges which are resistant to deformation can be formed therein. We have found that a very desirable mask can be made from a thin (.007" to .010") cold rolled steel plate with a nickel, cadmium, or chromium, or coated with a protective lacquer. Thus the mask serves also to reflect heat and helps to keep down the temperature of a film during projection.

Molded onto the front face of the frame, in encircling relation to the recess 13, are upstanding ribs, or lips 20. As shown, one of these ribs extends substantially the full length of each side of the recess, and includes a straight wall which forms an extension of the vertical wall of the recess and which projects above the plane of the front face of the frame. It might be emphasized that these upstanding ribs, or lips, are made of the same thermoplastic material as the frame itself, and which material is sensitive to heat and/or pressure so that they can be deformed to hold the mask and transparency in assembled relation in the recess of the frame.

The mount is assembled by inserting the transparency 18 into the recess 13 of the frame 10 which is approximately twice as deep as the combined thickness of the transparency and the inlay mask, see Fig. 5. The inlay mask is then placed on top of the transparency and heat and pressure are applied to the upstanding ribs by any suitable apparatus to cause the same to flow inwardly of the recess and over the edges of the mask, as shown in Figs. 1 and 6, so that upon cooling, the mask and transparency are sealed securely in place.

As is well known to those in the art, transparencies of the type set forth expand when heated, and, if securely held, would tend to curl or buckle, thus throwing the image of the transparency out of the focal plane of the optical members of the projector, the disadvantages of which are well known. To overcome this effect, in the present mount the recess 13 is made slightly larger than the outside dimensions of the transparency so as to leave a free space between the edges of the transparency and the walls of the recess, indicated at 21, so that the transparency is free to expand laterally so as not to prevent buckling due to heat. There is not sufficient pressure applied on the upstanding ribs in flowing them over the edges of the mask to cause them to pinch the edges of the transparency between the mask and the bottom of the recess to prevent free lateral expansion of the transparency due to heat. In fact, since the face of the mask is below the plane of the front face of the frame, see Figs. 5 and 6, the step of flowing the ribs 20 over the edges of the mask puts no pressure on the face of the mask, but the flowed-over ribs merely serve as stops to hold the mask in the recess.

As shown in Figs. 1 and 6, the upstanding ribs are preferably so designed and proportioned with reference to the depth of the recess not filled by the mask and transparency that when they are flowed over the edges of the mask the top surface of each lies in the plane of the front face of the frame. Furthermore, the ends of each of the ribs are suitably cut away as indicated at 22, so that when they are flowed inwardly they will abut one another on a 45-degree line of intersection and form a true rectangular opening. These last mentioned two features, it will be readily understood, are not essential to the mount but are desirable inasmuch as they appreciably improve the appearance of the assembled structure.

As is well known to those in the art, the transparency mounts of the type set forth are often used in slide changing devices which are adapted to feed the slides individually from a supply magazine into projecting position in a projector and then on into a receiving magazine. A slide changing device of the type referred to is disclosed in U. S. Patent 2,213,779, D'Arcy A. Young, Jr., which issued September 3, 1940. In slide changers of the type referred to, the mounts are stacked in a magazine in face to face relation and in moving from one magazine to another, the front surface of one slide must slide over and in contact with the rear surface of another immediately adjacent thereto. It has been found that with mounts of known types having sharp edges and corners on the outside of the frame that the mount being moved into the takeup magazine, instead of sliding freely behind the mount previously moved into position therein, would catch on the edge of said mount and refuse the slide therebehind, thus jamming the changer. A difficulty of the same nature was found to occur when the outer corner of the picture aperture in the rear face of the frame was sharp and a sharp corner on another mount sliding laterally of that face came into contact with said sharp corner.

To overcome these disadvantages of known mounts and to adapt the present mount for trouble-free use in slide changers of the type mentioned, certain provisions in the design of the mount have been provided which are important although offhand they may appear to be insignificant.

One important feature of the present mount which facilitates its use in slide changers of the type set forth is the tapering of the front surface of the frame at, and adjacent, the corners thereof, as indicated at 25. This tapering forms portions of reduced thickness adjacent the corners of the mount which permit the mount to be readily slid from the projecting position into the stack of mounts in the takeup magazine, of a slide changer, and at the same time provides an edge on the mount of considerable thickness at its center portion to offer the necessary abutting surface for engaging and moving a previous slide from the projecting position to the takeup chamber.

To further facilitate the use of these mounts in changers of the type mentioned, the corners of the rear face of the mount are rounded as shown at 26, and the outer corners of the picture aperture 15 at the rear face of the frame are rounded inwardly as shown at 27, Figs. 5 and 6. The rounding of the corners of the picture aperture 15 overcomes the chance of sharp corners on the edge of a mount unlike the present one from catching on this corner when said latter mount is slid across the rear face of the present mount in contact therewith. Furthermore, the rounded corners 26 on the present mount eliminate the chance of these corners being caught on the square corners of picture apertures in known mounts when slid thereacross in a mount changer. If all of the mounts used in a changer were of the type herein set forth it would probably be unnecessary to round both the corners 26 and 27. However, it has to be assumed that a person using this type of equipment will have mounts of known forms which will be used in a slide changer in conjunction with the present type of mount, and the rounding of the corners on the present mount as set forth are intended to eliminate the jamming of the slide changer using the present mount in conjunction with known mounts.

While we have chosen to show the upstanding ribs extending substantially the full length of each edge of the recess, it will be readily appreciated that the confining effect of the ribs could just as well be accomplished by one or more shorter ribs, essentially lugs, and that they would have to be provided on but two edges of the recess instead of all four. The only difference in the two arrangements would essentially be a sacrifice in appearance, not in result or invention. In addition, it will be readily appreciated that the upstanding ribs, or their equivalent, need not be of the form illustrated, or need not be formed so that one wall thereof forms an extension of the vertical wall of the recess. The ribs could be of any desired configuration and could be located at a substantial distance from the edge of the recess so long as they would include sufficient material to permit them to flow inwardly over the edge of the recess by the application of heat and pressure to confine the mask and transparency in the manner set forth.

If desired, the panels 28 can be provided on the front face of the frame for marking the exposure data or descriptive information on the mount, and said panels can be easily made by merely sandblasting the molding die.

From the above description, it will be readily apparent that a transparency mount constructed in accordance with the present invention possesses all of the features deemed essential to such a mount. In the first place, it is easily, cheaply, and rapidly fabricated from a material which is light, rigid, unbreakable, capable of being formed with sharp pictures defining edges, or rounded exposed corners. This mount utilizes the ability of thermoplastic material to be reformed after original molding to provide an accurate, and readily carried out, method of assembling a transparency in the mount. The mount not only has a sales appeal due to its pleasing finished contour, but such contour adapts the mount for use in well-known types of slide changers in the sense that it overcomes conditions prevalent in known types of mounts which cause jamming of such slide changers. An examination of Figs. 5 and 6 will show that the faces of the transparency itself are offset inwardly from the faces of the frame when mounted therein so that the faces of the transparency are not subject to abrasions due to the sliding of one mount over the face of another, although they are not protected by glass or other transparent coverings as is true of other mounts on the market.

Although we have shown and described certain specific embodiments of our invention, we are fully aware that many modifications thereof are possible. Our invention, therefore, is not to be restricted except insofar as is necessitated by the scope of the appended claims.

Having thus described our invention, what we claim is new and desire to secure by Letters Patent of the United States is:

1. A mount for a transparency comprising a molded frame of thermoplastic material, the front face of said frame provided with a recess of a shape and size to receive a transparency, the rear face of said frame member provided with a picture aperture extending through to said recess, an inlay mask seated in said recess in superposed relation to the transparency and formed with an aperture complementary in shape and size to the picture area of said transparency, said frame including an upstanding rib on its front face in encircling relation to said recess and adapted to be flowed over the edges of said inlay mask by the application of pressure and heat to hold the mask and transparency in assembled relation in said recess.

2. A mount for a transparency comprising a molded frame of thermoplastic material, the front face of said frame provided with a recess complementary in shape but slightly larger than a transparency adapted to be seated therein, the rear face of said frame member provided with an aperture extending through to said recess and of a size and shape to frame the picture area of said transparency, an inlay mask of a size and shape to fit snugly into said recess adapted to be seated in said recess in superposed relation to the transparency, and formed with an aperture adapted to register with the aperture in the rear face of said frame, said frame including upstanding portions on the front face adjacent at least two edges of said recess, and adapted to be flowed over the edges of said inlay mask by the application of heat and pressure to hold the mask and transparency in assembled relation in said recess.

3. A mount for a transparency comprising a molded frame of thermoplastic material, the front face of said frame provided with a recess complementary in shape but slightly larger than a transparency adapted to be seated therein, the rear face of said frame member provided with an aperture extending through to said recess and of a size and shape to frame the picture area of said transparency, an inlay mask of a size and shape to fit snugly into said recess adapted to be seated in said recess in superposed relation to the transparency, and formed with an aperture complementary in shape and size to said aperture in the frame, said frame including four upstanding ribs one adjacent and extending substantially the full length of each margin of said recess, each of said ribs adapted to be flowed over the edges of said inlay mask by the application of heat and pressure to hold the mask and transparency in assembled relation in said recess.

4. A mount for a transparency comprising a molded frame of thermoplastic material, the front face of said frame provided with a recess complementary in shape but slightly larger than a transparency adapted to be seated therein, the rear face of said frame member provided with an aperture extending through to said recess and of a size and shape to frame the picture area of said transparency, an inlay mask of a size and shape to fit snugly into said recess adapted to be seated in said recess in superposed relation to the transparency, and formed with an aperture complementary in shape and size to said aperture in the frame, said frame including upstanding portions on the front face of at least two edges of said recess, one edge of each of said portions forming an extension of the vertical wall of said recess and extending above the face of the frame, said portions adapted to be flowed over the edges of said inlay mask by the application of heat and pressure to hold the mask and transparency in assembled relation in said recess.

5. A mount for a transparency comprising a molded frame of thermoplastic material, the front face of said frame provided with a recess complementary in shape and size to a transparency adapted to be seated therein, the rear face of said frame member provided with an aperture extending through to said recess and of a size and shape to frame the picture area of said transparency, and means for holding a transparency in said recess in proper alignment with said aperture, said means including upstanding ribs molded on the face of said frame adjacent at least two edges of said recess, said ribs adapted to be flowed inwardly of the edges of said recess and into overlapping relation with respect to the edges of the transparency therein by the application of heat and pressure thereto.

6. A mount for a transparency comprising a molded substantially rectangular frame of thermoplastic material, the front face of said frame adjacent and including the corners thereof tapered toward the rear face of the frame to provide portions of reduced thickness to facilitate the use of the mount in an automatic slide changer, the front face of said frame provided with a recess of a shape and size to receive a transparency, the rear face of said frame member provided with an aperture extending through to said recess and of a size and shape to frame the picture area of said transparency, an inlay mask seated in said recess in superposed relation to the transparency and formed with an aperture complementary in shape and size to said aperture in the frame, an upstanding rib formed on the front face of said frame in encircling relation to said recess, said rib adapted to be flowed over the edges of said mask by the application of pressure and heat to hold the mask and transparency in assembled relation in said recess.

7. A mount for a transparency comprising a molded frame of thermoplastic material, the front face of said frame provided with a recess of a shape and size to receive a transparency, the rear face of said frame member provided with an aperture extending through to said recess and of a size and shape to frame the picture area of said transparency, the outer corner of said aperture rounded inwardly from the plane of the rear face, an inlay mask seated in said recess in superposed relation to the transparency and formed with an aperture complementary in shape and size to said aperture in the frame, said frame including an upstanding rib on its front face in encircling relation to said recess and adapted to be flowed over the edges of said inlay mask by the application of pressure and heat to hold the mask and transparency in assembled relation in said recess.

8. A mount for a transparency comprising a molded substantially rectangular frame of thermoplastic material, the front face of said frame adjacent and including the corners thereof tapered toward the rear face of the frame to provide portions of reduced thickness to facilitate the use of the mount in an automatic slide changer, the front face of said frame provided with a recess of a shape and size to receive a transparency, the rear face of said frame member provided with an aperture extending through to said recess and of a size and shape to frame the picture area of said transparency, the outer corner of said aperture rounded inwardly from the plane of the rear face to facilitate the use of the mount in automatic slide changers, an inlay mask seated in said recess in superposed relation to the transparency and formed with an aperture complementary in shape and size to said aperture in the frame, an upstanding rib formed on the front face of said frame in encircling relation to said recess, said rib adapted to be flowed over the edges of said mask by the application of pressure and heat to hold the mask and transparency in assembled relation in said recess.

9. As an article of manufacture, a mount for transparencies comprising a molded frame of thermoplastic material, the front face of said frame provided with a recess of a shape and size to receive a transparency, the rear face of said frame member provided with an aperture extending through to said recess and of a size and shape to frame the picture area of a transparency, an inlay mask adapted to fit into said recess in superposed relation with a transparency therein and provided with an aperture complementary in size and shape to said aperture in the frame, and upstanding portions molded on the front face of said frame adjacent at least two edges of said recess and adapted to be flowed inwardly of the edges of said recess by the application of heat and pressure to hold the mask and a transparency in assembled relation in said recess.

10. As an article of manufacture, a frame for a transparency mount comprising a thin open frame of thermoplastic material, one face of said frame provided with a recess in encircling relation to the opening of the frame and in which a transparency is adapted to be seated in registry with the frame opening, and upstanding ribs formed on the recessed face of the frame adjacent at least two edges of the recess therein, and each of said ribs formed of the material of said frame and having a wall lying in a plane substantially contiguous with the vertical walls of said recess to enhance the depth of said recess without restricting the lateral dimensions thereof, whereby they are adapted to be flowed inwardly of the edges of the recess by the application thereto of heat and pressure after the transparency is seated therein and for the purpose of holding the transparency in said recess.

11. In the method of assembling a transparency within a mount consisting of a frame of thermoplastic material having a recess in one face surrounding the opening of the frame and into which a transparency is adapted to be seated and having upstanding portions of thermoplastic material on the recessed face of the frame adjacent at least two edges of said recess, the steps of placing a transparency in said recess, and then flowing said upstanding portions inwardly over the edges of said recess by the application of heat and pressure, and into overhanging relation with the edges of the transparency situated in said recess.

12. The method of assembling a transparency mount including a frame of thermoplastic material provided with a recess in one face thereof in encircling relation to the opening of the frame and having thermoplastic ribs on the recessed face of the frame adjacent at least two edges of the recess, the steps of seating a transparency in said recess in register with the frame opening, placing a masking frame in said recess in superposed relation with said transparency, and then flowing said ribs inwardly over the edges of said recess by the application of heat and pressure and into overhanging relation with the edges of said masking frame situated in said recess.

HAROLD L. FITCH.
THOMAS L. O'TOOLE.